Oct. 4, 1932.   R. H. BOWMAN   1,880,402
SAFETY VALVE.
Filed Nov. 8, 1930

INVENTOR
Robert H. Bowman
BY
Ely & Barrow
ATTORNEYS

Patented Oct. 4, 1932

1,880,402

UNITED STATES PATENT OFFICE

ROBERT H. BOWMAN, OF AKRON, OHIO, ASSIGNOR TO THE FIRESTONE TIRE & RUBBER COMPANY, OF AKRON, OHIO, A CORPORATION OF OHIO

SAFETY VALVE

Application filed November 8, 1930. Serial No. 494,274.

This invention relates to valves, and more especially to safety valves of the quick acting type.

The chief object of the invention is to eliminate the human factor in dangerous situations. A more specific object is to provide an improved valve which is normally closed, but which may be automatically and instantly opened to its maximum capacity upon occasion.

Illustrative of the utility of the invention in the rubber industry, the improved valve has been installed in the pipe which conducts water under high pressure to the hydraulic ram of a vertical vulcanizer and the valve-actuating mechanism connected to an overhead structure which is engaged by the vulcanizer cover when raised to an excessive height by the ram. Opening of the valve immediately relieves the hydraulic pressure upon the vulcanizer ram and its further ascent is prevented.

Figure 1:
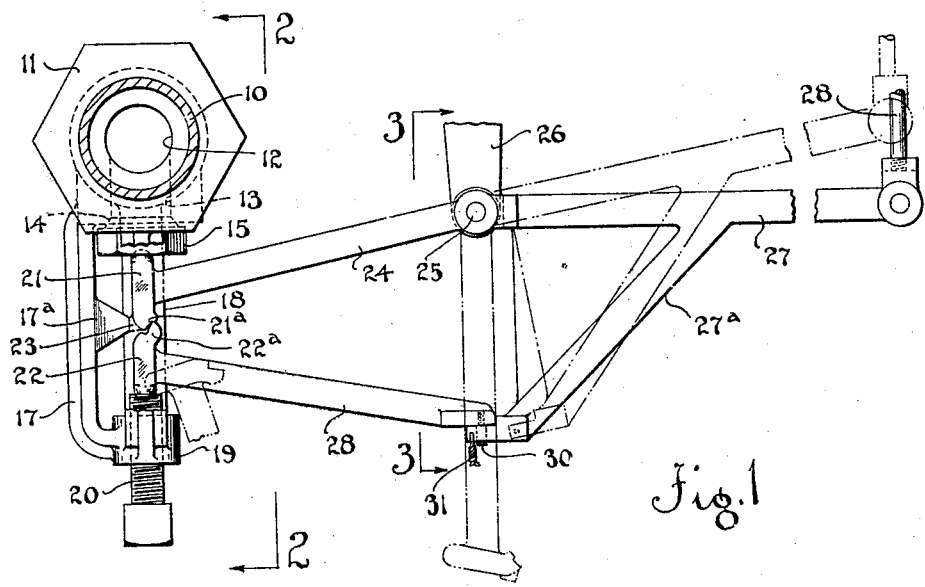
Figure 1 is a front elevation of the valve structure in its preferred form.
Figure 2:
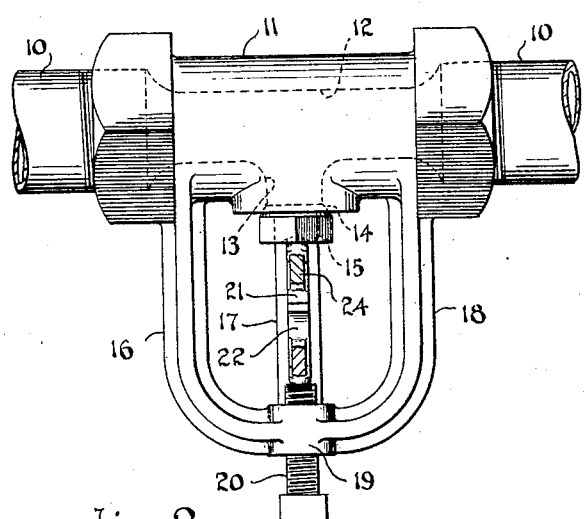
Figure 2 is a section on line 2—2 of Figure 1.

Referring to the drawing, 10 is a pipe line for conveying fluid under pressure, and 11 is a valve casing mounted therein, said valve casing being formed with a through passage 12 through which fluid from the pipe line 10 flows unimpeded.

The valve structure also is formed with a relief port 13 extending laterally from the passage 12, said relief port being formed with a flared frusto-conical orifice 14 in the side wall of the casing which orifice constitutes a seat for a complementally tapered stopper or valve member 15.

The valve casing 11 is formed with three parallel arms 16, 17 and 18, which arms extend laterally from the casing and at their outer ends converge and merge with a boss 19 which is apertured in axial alignment with the valve member 15. The aperture in the boss 19 is threaded to receive an adjusting screw 20.

Positioned between the valve member 15 and screw 20 is a pair of toggle arms 21, 22, normally positioned in alignment so as to hold the valve 15 in its seat 14. The valve member 15 and screw 20 are slightly recessed as shown to provide respective sockets for the reception of one end of each of the toggle members. At their adjacent ends the toggle arm 21 is formed with a notch $21^a$ and the toggle arm 22 is formed with a toe $22^a$ adapted to seat in the notch $21^a$, the arrangement being such as to provide a pivot at the point where the toggle arms engage each other, which pivot is off center with relation to the axis of the valve 15 and screw 20. To position accurately said pivot point, the arm 17 is formed with a lateral extension $17^a$ which is abutted by a boss 23 formed on the toggle arm 21.

The pivot at the juncture of toggle arms 21, 22, usually designated the "knee" of the toggle, is so slightly off center with relation to the axis of the valve 15 that the toggle possesses high mechanical advantage and thus but relatively light pressure is required to hold the toggle arms in the positions shown, whereby they hold the valve 15 firmly seated against the high pressure of the fluid in the pipe 10.

Figure 3:
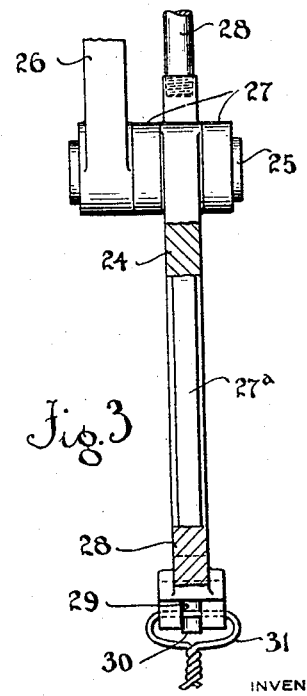
Figure 3 is a section on line 3—3 of Figure 1.

For holding the toggle arms 21, 22 securely, but releasably, in the operative position shown in full lines in the drawing, the toggle arm 21 is formed with a lever 24 which is pivotally mounted at 25 upon a bracket 26, the latter being supported upon any suitable structure adjacent the valve structure. Also pivotally mounted upon the bracket 26 is a lever 27, the free end of which is connected by a cable or rod 28 to a movable structure (not shown) upon the movement of which it is desired to relieve the pressure in the pipe 10. The lever 27 is formed with an arm $27^a$ extending obliquely from an intermediate portion thereof, and the free end of the arm $27^a$ is positioned beneath and supports the free end of a lever 28 formed on the toggle member 22, the arrangement being such that the lever 28 holds the lever 27 in the horizontal position shown. The free end of the arm $27^a$ is formed with slot 29 (Figure 3) extending longitudinally of the arm from the end thereof, and a stud 30 mounted in the end portion of the lever 28 extends through said slot. A piece of breakable cord or soft copper wire 31 is threaded through suitable apertures in the end portion of the arm 27ª, and across the open end of the slot 29, thus preventing the stud from passing out of the open end of the slot without rupturing the wire 31.

In the operation of the device, the various parts are normally in the positions shown in full lines in the drawing whereby the valve member 15 is held securely in its seat. When a situation arises requiring the immediate relief of pressure in the pipe 10, pull is exerted on the cable 28 sufficient to break the wire 31 and move the lever 27 to the position shown in broken lines in Figure 1, thereby moving the supporting arm 27ª from beneath the free end of the lever 28, and permitting gravity, and pressure behind the valve 15 acting through the toggle arms 21, 22, to swing the levers 24, 28 toward the broken line positions shown, with the result that support is removed from the valve member 15 and it is projected from its seat.

Fluid issuing from the relief port 13 of the valve relieves the pressure in the pipe 10. Further escape of fluid may be prevented by suitably positioned, manually-controlled gate valves (not shown).

Wires or cords 31 of different strength may be used for controlling the magnitude of the force necessary to operate the valve and to prevent inadvertent operation thereof.

The valve is simple in construction and positive and immediate in its action, whereby the objects set forth in the foregoing statement of objects are attained.

The invention is susceptible of modification within the scope of the appended claims which are not limited wholly to the specific construction shown and described.

What is claimed is:

1. In a safety valve, the combination with a valve structure and a toggle normally holding the valve closed, of a lever arm extending from one member of the toggle, a support for said lever-arm normally holding the toggle in its operative position adapted to be displaced by the application of force of determinate magnitude, and a breakable member interposed between the lever-arm and its supporting member.

2. In a safety valve, the combination with a valve structure and a toggle normally holding the valve closed, of a lever-arm extending from one member of the toggle, a pivotally mounted lever adapted to be moved when the valve is to be opened, and an arm extending from said lever and forming a support for the toggle lever-arm to normaly hold the toggle in its operative position.

3. A combination as defined in claim 2 including a breakable member interposed between the toggle lever-arm and its supporting arm.

4. In a safety valve, the combination with a valve structure and a toggle normally holding the valve closed, of a lever-arm extending from one member of the toggle, a support for said lever-arm formed with an open-end slot, a stud mounted upon the lever-arm and extending into said slot, and a breakable member across the end of said slot preventing the withdrawal of the stud therefrom except upon the application of force sufficient to rupture the breakable member.

ROBERT H. BOWMAN.